Patented Apr. 25, 1939

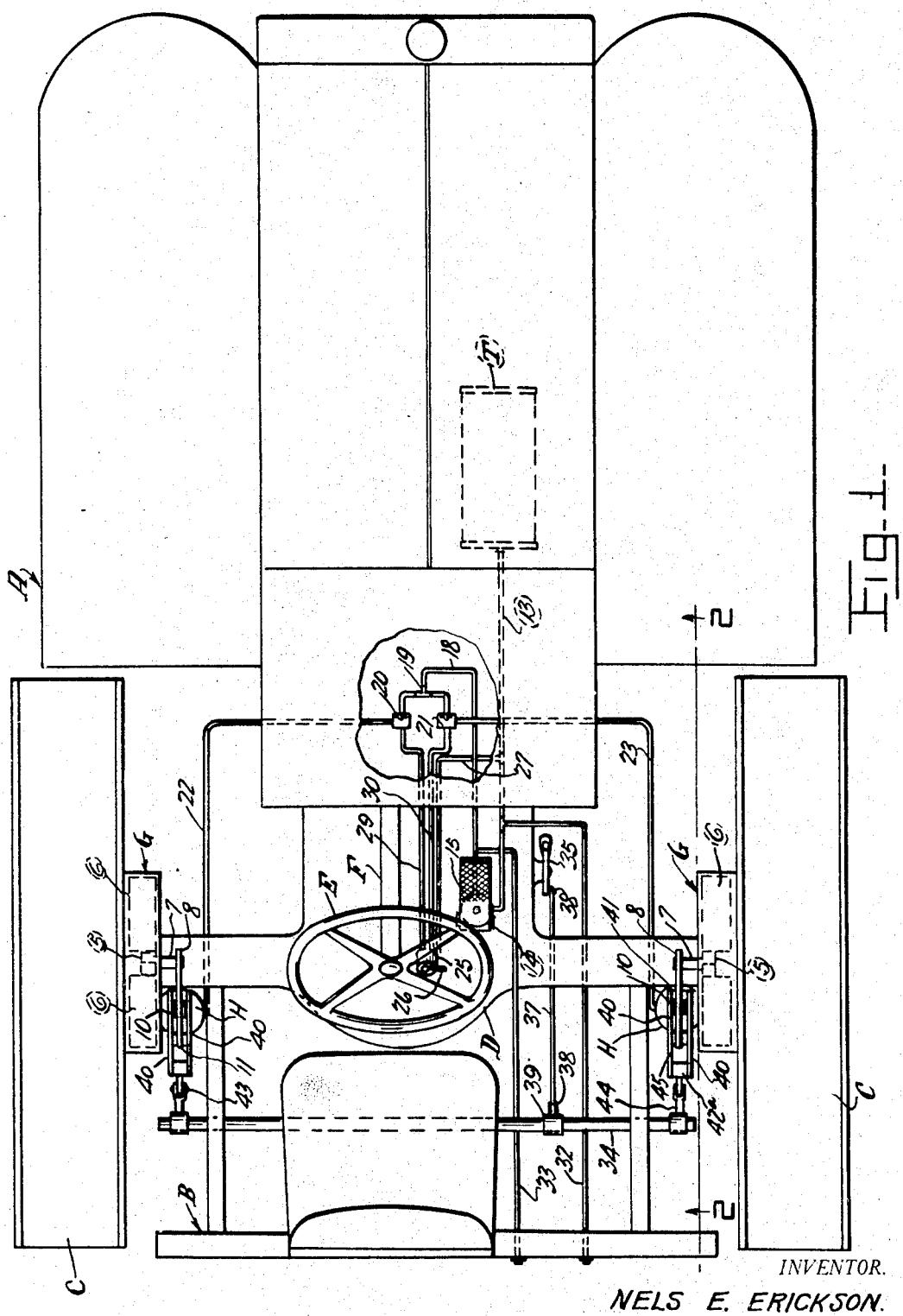

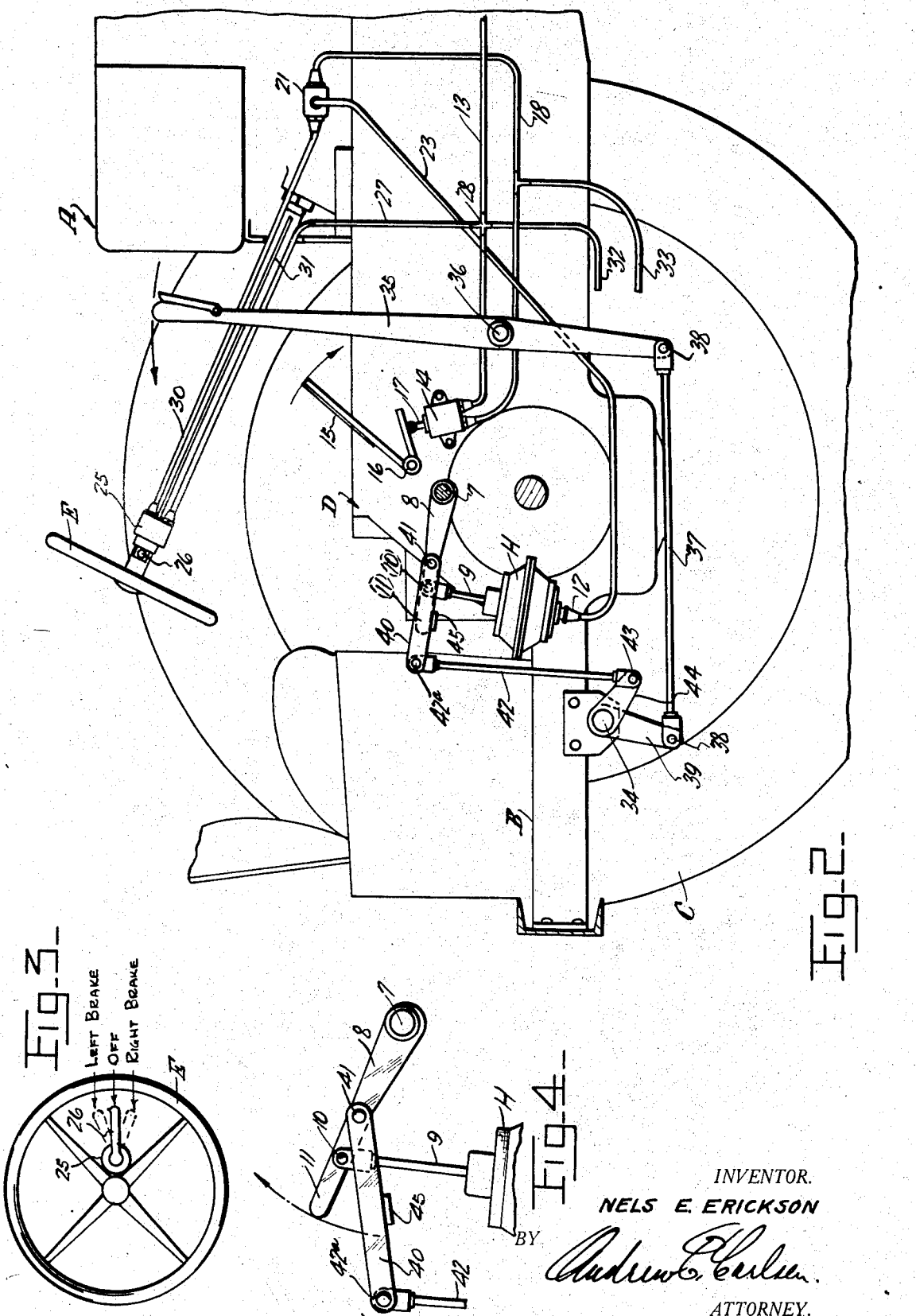

2,155,701

UNITED STATES PATENT OFFICE 2,155,701

AIR BRAKE

Nels E. Erickson, Minneapolis, Minn., assignor to Minneapolis-Moline Power Implement Company, Minneapolis, Minn., a corporation of Delaware Application February 16, 1938, Serial No. 190,742

5 Claims. (Cl. 188—106)

This invention relates to improvements in brake systems for tractors.

The primary object of the invention is to provide an improved air brake assembly for a tractor and in which the ordinary control of the brakes is carried out through a foot brake pedal but in which either wheel may be braked or locked, alone, by the manipulation of an auxiliary control to thus enable the tractor to turn in a shorter radius. Another object is to provide a brake assembly wherein the brake control of either or both traction wheels is possible entirely independently and without deleterious interaction of the controls and employing but a single brake band or shoe assembly on each wheel. A further object is to provide a brake assembly wherein a mechanical or emergency brake control is connected to the brake operating elements of the air brake system in such manner that, while normally ineffective, the mechanical braking force may be brought into play at any time.

The foregoing and other more specific objects of this invention will be made apparent in the course of the following detailed specification, reference being had to the accompanying drawings, wherein:

Figure 1 is a plan view of a conventional form of tractor, showing the application of a braking system embodying this invention.

Figure 2 is an enlarged vertical section along the line 2—2 in Figure 1.

Figure 3 is a plan or elevation of the steering wheel of the tractor showing the hand control valve associated therewith.

Figure 4 is an enlarged fragmentary side elevation showing the connection of the mechanical and air brake operating mechanisms to the brake arm.

Referring now with more particularity to the drawings, the reference character A designates a tractor of conventional form comprising the frame B supported on the large rear traction wheels C, and including also the differential housing D, the steering wheel E and steering column F. The present invention is, of course, adaptable for use on any conventional type of tractor and the mechanical details of supports and arrangement of the parts as herein shown and described are considered as illustrative only.

The wheels C have the conventional brake assemblies G at their inner sides and the cams 5 operating the brake bands or shoes 6 are actuated by inwardly directed shafts 7 which carry the rearwardly and radially extended operating arms or levers 8. Conventional pneumatic cylinders H are secured to the brake assemblies G below these arms 8 and the power responsive, reciprocating plunger rods 9 of these cylinders are extended upwardly and pivotally connected at 10 to the arms 8 some distance from the free ends 11 thereof. The foregoing arrangement is such that, when air under pressure is admitted to the lower end of the cylinders, at the couplings 12, the plunger rods 9 are urged upwardly and the arms 8 are oscillated to the position shown in Figure 4 to set the brakes on the wheels.

The compressed air for thus operating the cylinders H is provided by a tank T and is supplied to said tank by a suitable compressor (not shown) driven by the tractor engine. A supply line 13 leads from the tank T to a master control valve 14, which valve normally stands in closed position but which may be opened by pressure on the foot pedal 15. The foot pedal 15 is pivoted at 16 to the differential housing D and operates the plunger 17 of the valve to open and close the same. In opened position the valve 14 connects the supply line 13 to the main line 18 which leads to a T 19 and is branched off and connected to the conventional two-way check valves 20 and 21. From these valves 20 and 21 separate feeder lines 22 and 23 run to the left and right wheel brake operating cylinders H respectively and the check valves are operative to allow the passage of the air to the cylinders when the foot pedal 15 is pressed to open the master valve 14. In this manner, then, both wheels may be braked simply by the operator placing his foot on the pedal 15 and depressing the same in well known manner.

A conventional form of three way or multiple position valve 25 is mounted in any convenient position, as beneath the steering wheel E on the steering column F, and this valve serves as an auxiliary and independent control for independent operation of the brakes. For this purpose the valve 25 is of the type having an "off" position, determined by one position of its operating handle 26, and having two other positions designated "left brake" and "right brake" in Figure 3. A supply or feeder line 27 runs to this valve 25 from the main supply line 13 at the T 28 and also there are separate lines 29 and 30 leading to the two check valves 20 and 21. When the valve operating handle 26 is moved to "left brake" position the supply line 27 is connected to the line 29 and thus air enters the left wheel brake operating cylinder H setting that brake. At the same time the valve 25 vents the right wheel brake operating cylinder H through an exhaust line 31. When the valve handle 26 is moved to "right brake" position the supply line 27 is connected to the line 30, and the air enters the right wheel brake cylinder H setting the right wheel brake and venting the left brake cylinder. The check valves 20 and 21 meanwhile operate automatically to open the passage between the lines 22 and 29 and 23 and 30 while closing the line 18. On the other hand, when the master valve 14 is opened these check valves 20 and 21 seal the lines 29 and 30.

From the foregoing it will be apparent that the operator may lock either wheel of the tractor at will and may thus make a very sharp turn when required. It will also be noted that the two control valves 14 and 25 operate entirely independently and do not interfere in any way with each other.

Outlet lines 32 and 33 lead from the supply line 13 and feeder line 18 out to the rear of the tractor and serve as convenient connections for the operation of the brakes of a trailer or implement drawn by the tractor.

The emergency or mechanical brake operating assembly comprises a rocker shaft 34 journaled transversely across the tractor frame B below and rearwardly of the arms 8. This shaft may be rocked on its axis by a hand lever 35 pivotally mounted intermediate its ends at 36 on the differential housing and having a link 37 pivotally connected at its ends 38 between the lower end of the lever and a rocker arm 39 secured to the shaft. Lift bars 40 are pivoted at 41 on each side of each brake operating arm 8 and extend rearwardly therefrom in parallel relation. The pivotal points 41 are located between the shafts 7 and the pivotal connections 10 of the cylinder plunger rods 9, and the bars 40 are so spaced that they will clear this connection 10. Between the rear ends of each pair of lift bars 40 a push rod 42 is pivotally mounted at 42a, and these rods extend downwardly and are pivoted at their lower ends 43 to arms 44 secured to the shaft 34 near its ends. Beneath the free rear ends 11 of the brake operating arms 8 each pair of the lift bars are joined by a transversely extended lift member 45.

In the normal operating of the air brake system, the operating arms 8 as they move upwardly to set the brakes will simply swing the lift bars 40 upwardly on their pivotal connections 42a without in any way influencing the mechanical brake operating elements. However, the operator may at any time, by pulling the hand lever 35 rearwardly, rock the shaft 34 and exert an upward thrust on the lift bars 42. The cross lift members 45 then engage the free ends 11 of the arms 8 and swing these arms upwardly to apply the brakes as will be readily evident. In the first case, then, the arms 8 move entirely independently of, and upwardly from between, the lift bars 40 while, in the latter case, the arms 8 and the bars 40 act as a unit. It will be evident, therefore, that this assembly of operating elements for the brake assemblies G permits the brakes to be applied either by air, or in an emergency, by manual manipulation of the lever 35.

While the brakes as herein set forth are operated by compressed air it is evident that they may be hydraulically operated, if so desired.

It is understood that changes may be made in the specific mechanical assembly as herein set out, so long as such changes lie within the spirit and the scope of the appended claims.

Having thus fully described the invention, what I claim as new and desire to secure by Letters Patent, is:

1. In a brake system for traction wheels of a tractor, brakes for the said wheels and the said brakes including shafts and operating arms extending therefrom, compressed air operated elements pivotally connected to the operating arms between the ends thereof, control means for the compressed air operated elements, lift bars pivoted at one end to the operating arms between the aforesaid connections and the shafts, the said lift bars having lift members extended transversely of the operating arms adjacent the free ends thereof, and manually operated brake setting means connected to the free ends of the lift bars.

2. In a brake system for traction wheels of a tractor, a brake for each wheel and each brake including an operating shaft and a brake setting arm extending therefrom, a compressed air operated element connected to the brake setting arm intermediate its ends, a pair of lift bars spaced apart to receive the brake setting arm of each brake, the said lift bars being pivoted at one end to the said arm at a point between the brake operating shaft and the connection of the air operated element, a lift member extended between the lift bars transversely across the free end of the brake setting lever, and a manually operated brake operating element pivotally connected to the free ends of the lift bars of each brake setting arm.

3. A vehicle brake operating device comprising an operating shaft, an arm secured to and extending from the shaft, fluid pressure operated brake setting means connected to the arm intermediate its ends, a lift member pivotally connected to the arm at a point between the said operating shaft and the connection of the arm to said brake setting means, means on the lift member for engaging the arm at a point outwardly of the connection between the arm and lift member, and manually operated brake setting means connected to the said lift member.

4. In an operating assembly for a vehicle brake including a brake shaft, an operating arm for the brake shaft, a fluid pressure operated cylinder and a rigid plunger extended therefrom and pivotally connected to the operating arm between the ends thereof, lift arms arranged at opposite sides of the operating arm and spaced apart to clear the said pivotal connection of the plunger rod, the said lift arms being pivotally connected at one end to the operating arm at a point spaced between the pivotal connection of the plunger rod and the brake shaft, means on the lift arms for engaging the operating arm in one direction, and a manually operated, rigid brake setting rod connected to the free ends of the lift arms.

5. In an operating assembly for a vehicle brake including a brake shaft, an operating arm extending from the brake shaft, a fluid pressure operated cylinder and a rigid plunger extended therefrom and pivotally connected to the operating arm between the ends thereof, lift arms arranged at opposite sides of the operating arm and spaced apart to clear the said pivotal connection of the plunger rod, the said lift arms being pivotally connected to the operating arm at a point spaced between the pivotal connection of the plunger rod and the brake shaft, means intermediate the ends of the lift arms for engaging the free end of the operating arm in one direction, and a manually operated, rigid brake setting rod connected to the free ends of the lift arms.

NELS E. ERICKSON.